March 12, 1957  O. LECANU-DESCHAMPS  2,784,888
LUGGAGE-RAILS FOR AUTOMOBILE VEHICLES
Filed April 13, 1953
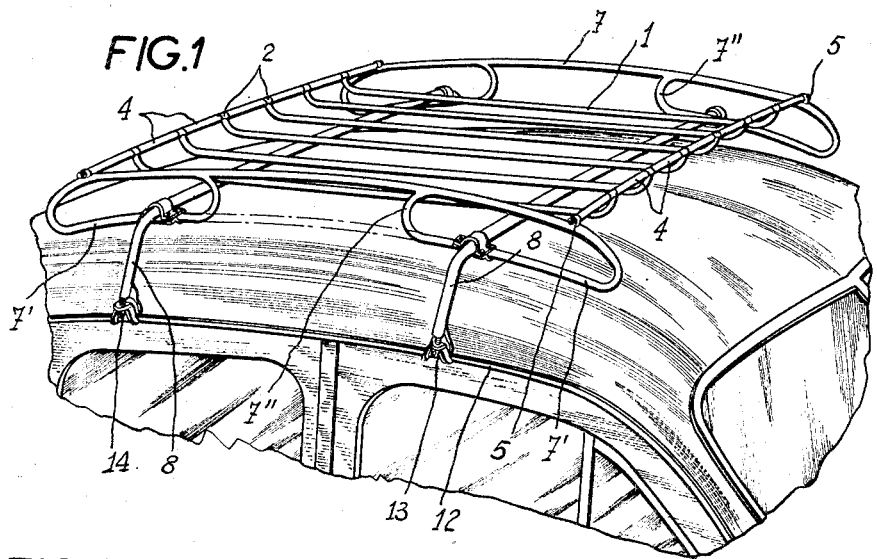
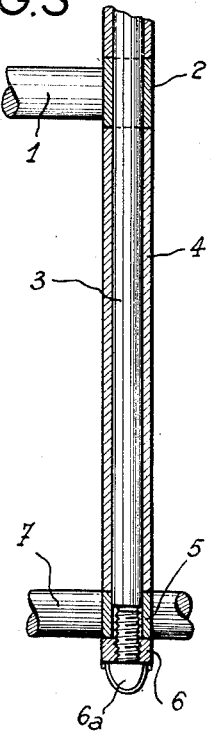
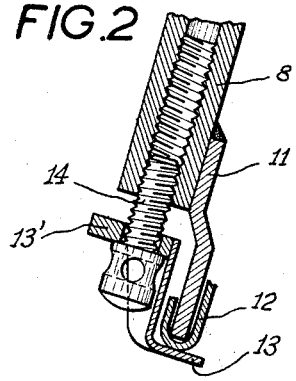
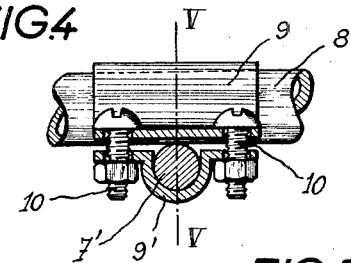
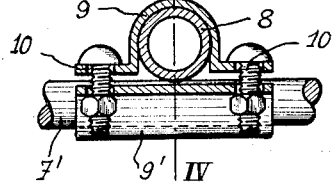
INVENTOR
OLIVIER LECANU-DESCHAMPS
BY
Jack F. Kramer
ATTORNEY

United States Patent Office 2,784,888
Patented Mar. 12, 1957

2,784,888

LUGGAGE-RAILS FOR AUTOMOBILE VEHICLES

Olivier Lecanu-Deschamps, Levallois-Perret, France

Application April 13, 1953, Serial No. 348,448

Claims priority, application France October 10, 1952

1 Claim. (Cl. 224—42.1)

This invention relates to luggage-rails and similar appliances for automobile vehicles and it has for its object to provide an improved removable luggage-rail for being affixed on the roof of an automobile vehicle, with the luggage-rail adapted to facilitate the dismantling thereof into its several parts, with said luggage-rail at the same time adapted for use on vehicles of different sizes.

The removable luggage-rail according to the invention is constituted by a plurality of longitudinal bars, bent upwards to be raised at both ends and each of said bars, provided at each end with a collar adapted to receive a rod passing through all the said collars at each end of the luggage-rail and through distance pieces ensuring even distribution or spacing of said longitudinal bars along the said rods, said rods being secured to supports for fixing the luggage-rail on the roof of a vehicle.

These rods ensure at the same time the rigidity of the assemblage of the said longitudinal bars and secure the latter to two lateral longitudinal members forming the sides of the luggage-rail and disposed in the plane of the raised ends of the longitudinal bars, so as to constitute a frame. These lateral members are, besides, fitted with supports which serve for the fixing of the luggage-rail on the roof of the vehicle in a position which is capable of being varied either transversely or longitudinally or in both directions.

The invention will be better understood with reference to the appended drawing, which represents, in the way of example only, a preferred embodiment of the invention.

In the drawing,

Fig. 1 is a perspective view of the luggage-rail after it has been placed in position on the roof of the vehicle.

Fig. 2 is a sectional view of a clip for fixing the said supports to the coachwork of the vehicle.

Fig. 3 is a partial longitudinal section by a horizontal plane through the axis of one of the assemblage rods.

Fig. 4 is a part section along the line IV—IV of Fig. 5 of a double collar for the assemblage, the section being parallel to the supports.

Fig. 5 is a section along the line V—V of Fig. 4, perpendicular to that shown in the latter figure.

The luggage-rail represented in the drawing comprises essentially a series of longitudinal rectilinear parallel bars 1, the two ends of which are curved upwards and provided with collars 2 the axes of which are horizontal and perpendicular to the said bar.

These several longitudinal bars are removably assembled by means (see Fig. 3) of a rod 3 at each end, passing through the collars 2 and through hollow distance pieces 4 disposed between two adjacent longitudinal bars, so as to ensure even distribution or spacing of the bars 1 along the said rods. These rods are besides engaged in collars 5 soldered on auxiliary longitudinal members 7, about to be described, and are provided with threads at both ends in order to allow the assemblage to be tightened, so as to form a rigid whole, by means of nuts 6, which are preferably of such design that the tightening may be performed without a spanner, for example with a cotter.

The auxiliary longitudinal members 7 on which are secured the collars 5 are raised with respect to the plane of the longitudinal bars 1 so as to form laterally of the vehicle a guard rail for the luggage. The elevation of these lateral members above the said plane is practically equal to the amount by which the upwardly curved ends of the longitudinal bars 1 are raised.

Each of the said auxiliary longitudinal members 7 is curved downwards back upon itself so as to comprise a lower branch 7' parallel to the main upper portion of the member 7, this branch 7' being either continuous as shown in broken lines in Fig. 1 or being reduced to two loops connected to the upper portion 7 by ties 7" as shown in full lines in Fig. 1.

The branches 7' serve for the fixing in position of the luggage-rail on the roof of the vehicle owing to their assemblage with supports 8 extending across the longitudinal bars 1, transversely to the length of the vehicle, and eventually adjustable in length. The assemblage of each branch 7' with the corresponding support 8 is performed by means of a double collar (Figs. 4 and 5) the two elements 9 and 9' of which are mutually perpendicular and receive respectively the support 8 and the branch 7'; they are secured to each other by bolts 10 adapted at the same time to clamp the said support and branch in position. It follows from this arrangement that the luggage-rail may be adjusted in the desired position either longitudinally or transversely or both, according to the type of vehicle on which it is to be fixed.

The supports 8 are besides fixed to the coachwork by the arrangement more particularly represented in Fig. 2 and constituted as follows:

The support 8 comprises at each of its ends a threaded bore and a lug 11 adapted to rest in the gutter of the coachwork, 12; and a catch 13, bent at right angles and soldered to a washer 13' adapted to bear against the gutter underneath the same. Through this washer, which is practically perpendicular to the lug 11 when it is in its operative position, passes a bolt 14 adapted to be screwed into an end of the support 8, thereby clamping the gutter 12 between the members 11 and 13. The head of this bolt is preferably so designed that it can be tightened without a spanner, for example by means of a small cotter.

The invention is capable of numerous alternative dispositions, particularly in what concerns the shape and curvature of the longitudinal bars and members. It will moreover be noted that the embodiment represented is that of a luggage-rail resting on the gutters, but it is nevertheless applicable to luggage-rails provided with four feet resting on the roof of the vehicle, the supports being merely hooked above the gutters.

What I claim is:

A luggage-carrier attachment for an automobile vehicle of the kind comprising a skeletal structure for placement over the roof of the vehicle and securing means connected to said skeletal structure for dependence therefrom and for temporary securement to the coachwork of the vehicle, said skeletal structure including a plurality of bars to extend longitudinally of the vehicle, each bar being bent upwards and provided with a collar at both ends, a rod at each of said ends, said rods passing through said collars, tubular distance pieces between said collars through which said rods also pass to maintain said bars in evenly spaced relationship, a longitudinal member disposed at each side of said plurality of bars constituted by an upper branch situated substantially in the plane of said ends of said bars and a lower branch adjustably connected with said securing means, a collar on said upper branch adjacent each end thereof in which one end of each of said rods are respectively engageable, and means for fastening the said ends of the rods to the said upper branch.

References Cited in the file of this patent

UNITED STATES PATENTS

| | | |
|---|---|---|
| 1,570,631 | Howard | Jan. 26, 1926 |
| 2,428,718 | Nauert | Oct. 7, 1947 |
| 2,444,201 | Lecanu-Deschamps | June 29, 1948 |
| 2,596,860 | McCrory | May 13, 1952 |

FOREIGN PATENTS

| | | |
|---|---|---|
| 974,493 | France | Sept. 27, 1950 |